United States Patent [19]

Nairn

[11] Patent Number: 5,291,726
[45] Date of Patent: Mar. 8, 1994

[54] SHAKER ROD FOR A HARVESTER

[76] Inventor: Donald J. Nairn, 12 Burnside Crescent, Christchurch, New Zealand

[21] Appl. No.: 971,394

[22] Filed: Nov. 4, 1992

[30] Foreign Application Priority Data

Nov. 4, 1991 [NZ] New Zealand .................. 240461

[51] Int. Cl.⁵ ............................................. A01D 46/28
[52] U.S. Cl. ..................................... 56/330; 56/340.1
[58] Field of Search ................... 56/328.1, 330, 332, 56/340.1

[56] References Cited

FOREIGN PATENT DOCUMENTS 2605487 4/1988 France .
2638600 5/1990 France .
2639177 5/1990 France ............................. 56/340.1
2645701 10/1990 France .
2654575 5/1991 France ............................. 56/340.1

Primary Examiner—David J. Bagnell
Attorney, Agent, or Firm—Vaden, Eickenroht, Thompson, Boulware & Feather

[57] ABSTRACT

A shaker rod constructed in two parts of different rigidities for a harvester is disclosed. The first part, in plan, includes a hook shaped region, so that it is generally the shape of a head of a shepherd's crook with a handle which is curved. The second and more rigid part is generally straight and is joined to the hook shaped end of the first part. This forms a generally continuous U-shaped end of the first part. The end of the shaker rod are mountable to shaker posts or shaker frames of a harvester which creates movement in the shaker rod when the harvester is used.

9 Claims, 2 Drawing Sheets

SHAKER ROD FOR A HARVESTER

FIELD OF THE INVENTION

The invention relates to harvesting and more particularly to mechanical harvesting of grapes and other fruit grown on vines or bushes.

BACKGROUND TO THE INVENTION

At present grapes and other fruit are grown in free-standing rows or on a trellis system. A number of different types of mechanical harvester have been used to harvest fruit and these include the machines described in French patent specification Nos. 2,654,701, 2,605,487 and 2,638,600. These harvesters normally consist of a straddle type tractor adapted to be driven over the row of bushes or the trellis. The tractor incorporates a shaker mechanism designed to contact each side of the bush or vine and subject it to sideways or other lateral movement at spaced vertical intervals. The shaker mechanism is designed to dislodge the fruit which falls under gravity to be collected on horizontally extending pivoting plates which form a collecting and conveying mechanism for the fruit. The tractor normally includes a conveyer mechanism or mechanisms for transferring the fruit from the collecting mechanism to a hopper or the like. The shaker mechanism as shown in the French specifications includes a series of horizontally extending shaker rods or bars positioned alongside each side of the internal passage through the harvester. The shaker rods are adapted by a mechanism or mechanisms to reciprocate in a horizontal plane.

Existing shaker bars have been constructed from metal or plastics materials and all have suffered from certain disadvantages in their effectiveness in creating the ideal motion for removing fruit.

An object of the present invention is to provide an alternative construction of shaker rod for a grape or fruit harvester.

Further objects and advantages of the invention will become apparent from the following description which is given by way of example only.

SUMMARY OF THE INVENTION

According to a broadest aspect of the invention there is provided a shaker rod for a harvester, the shaker rod being constructed in two parts of different rigidities, the first part in plan including a hook shaped region so that it is generally the shape of a head of a shepherd's crook with a handle which is curved, the second and more rigid part being generally straight and joined to the hook shaped end of the first part to thereby form a generally continuous U-shaped shaker rod the ends of which are mountable to a shaker post or shaker frame of a harvester which creates movement in the shaker rod when the harvester is used.

The first part of the shaker rod can be constructed from a length of rod formed from a plastics material which is bent into the required shape and the second part may be constructed from a length of fibreglass reinforced plastics rod.

The first and second parts of the shaker rod can be joined by a sleeve constructed from any suitable material such as a metal material.

The total rod shape created can be constructed totally of plastics materials of different rigidities, in two parts, if certain situations require extra flexibility.

Alternatively the first and second parts of the shaker rod can be manufactured from metal materials of different rigidities selected to give in to the first part of the rod a required degree of flexure the movement of which is stiffened by the counteracting movement of the second and more rigid part of the shaker rod.

The shaker rod can be round, square or rectangular in section so as to give a variety of different movements and a choice of surface contacts with the vine and/or fruit as required.

According to another aspect of the invention there is provided a harvester incorporating at least one shaker rod in accordance with the present invention.

DESCRIPTION OF THE PREFERRED EMBODIMENTS

The front of the harvester and direction of travel is indicated by the arrow 15.

In practice a harvester of the type shown in French patent specification No 2 605 487 incorporates, in a stacked arrangement, a plurality of shaker rods positioned and mounted on a self propelled or towed fruit harvester frame and the rods are adapted to be moved by a shaking mechanism.

Figure 1:
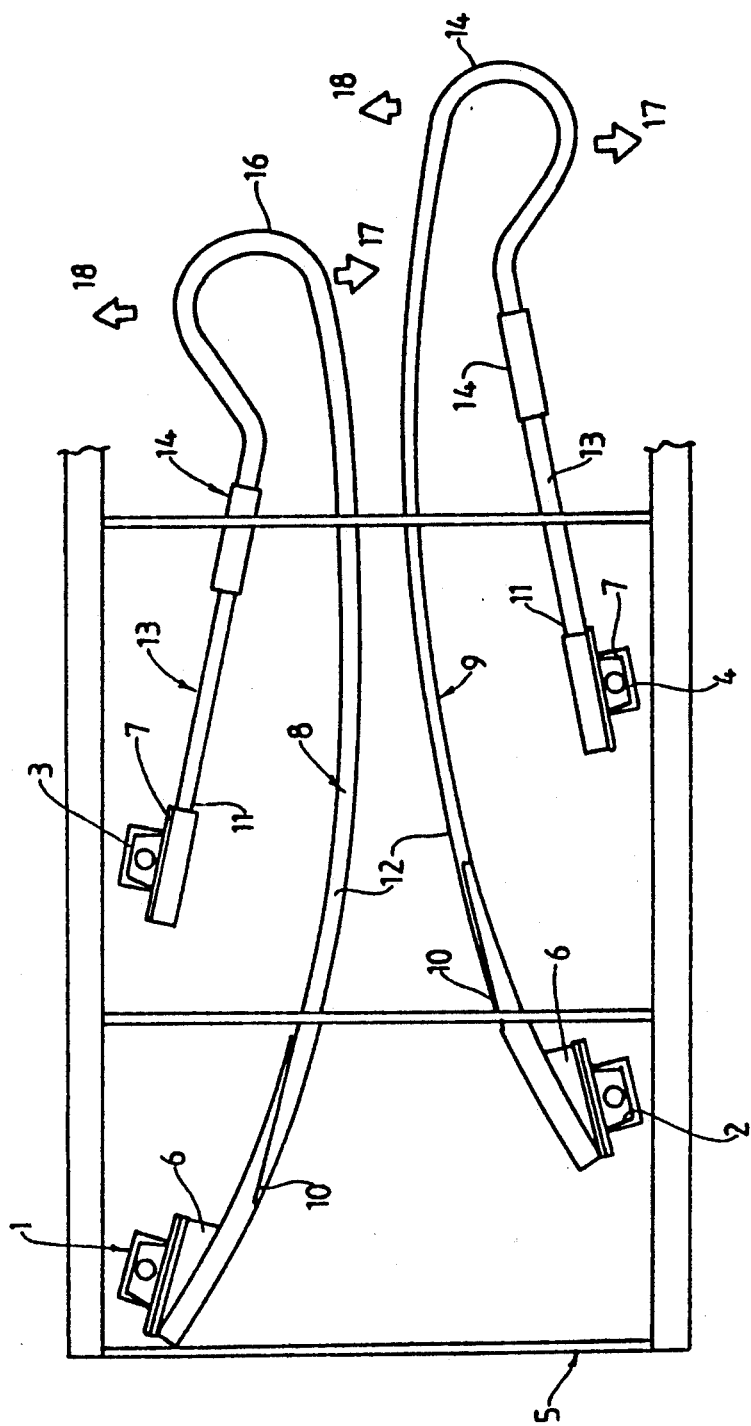
FIG. 1 shows a plan view of part of a harvester shaker mechanism incorporating shaker rods and shaker rod posts according to the invention.

The drive for the shaking mechanism is normally by an eccentric bearing or bearings connected to shaker posts on which are mounted the shaker rods. The post and rod assembly is generally mounted in a sub-frame. The shaker rods as described herein can be supported in any such known mechanism. As is shown in FIG. 1 it is envisaged that a series of shaker posts 1, 2, 3 and 4 be incorporated in a shaker frame 5. The shaker posts 1, 2, 3, 4 are driven by an eccentric bearing mechanism. It is also envisaged the shaker rod design can operate in a situation where only shaker posts 1 and 2 are driven by an eccentric bearing mechanism which allows shaker posts 3 and 4 to reciprocate freely. Alternatively only shaker posts 3 and 4 can be driven by an eccentric bearing mechanism allowing shaker posts 1 and 2 to reciprocate freely.

Figure 2:
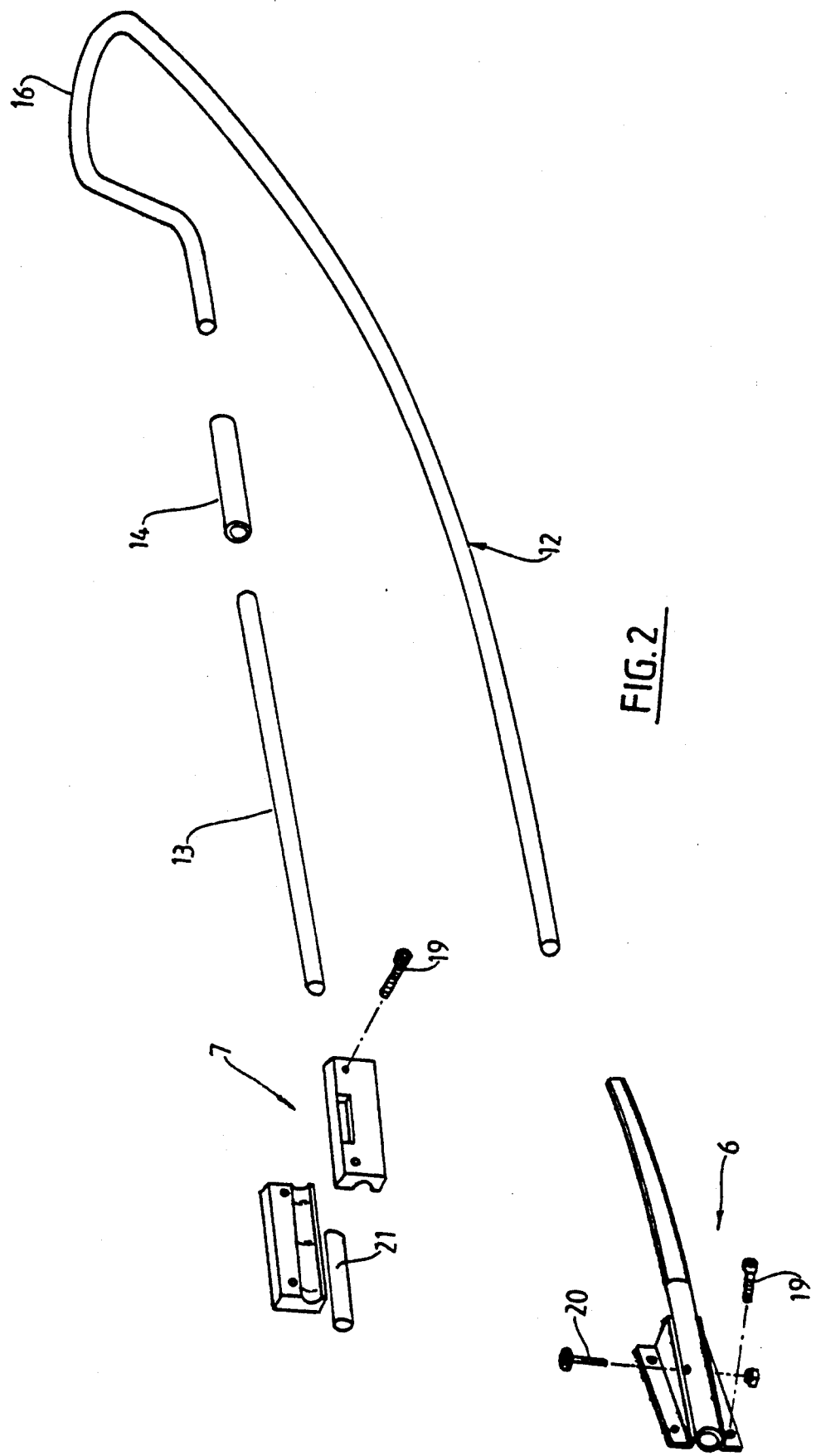
FIG. 2 shows a perspective view of a complete shaker rod in which the parts are exploded apart for clarity.

As the shaker posts are designed to accept and support fasteners or holders 6, 7 (shown in both FIGS. 1 and 2) for the ends of shaker rod assembly 8, 9 (only one of which is shown in FIG. 2). The precise vertical placement and spacing of the rod holders 6, 7 can be adjusted or set at appropriate levels to achieve optimum fruit removal results.

This can be effected by forming in the shaker posts a plurality of tapped holes in which locating bolts 19 (FIG. 2) are engaged.

In the construction shown the shaker posts 1, 2, 3 and 4 are not directly opposite each other although it is envisaged that they can be if required.

The rod holders 6, 7 can be fabricated or cast. Ideally the rod holders 6, 7 are designed to clamp the ends 10, 11 of the shaker rods between two parts (FIG. 1) which form the holders. It is of course contemplated that the rod holders 6, 7 can be a one piece unit in which the ends of the shaker rods are inserted and fixed by any suitable means.

The rod holders 6, 7 for the front 1, 2 and rear 3, 4 shaker posts can be of the same in construction and shape. In order to obtain the necessary and desired angles as shown in the plan view the rod holders 6 and 7 can be slightly different in configuration as shown. In an alternative construction (not shown) it is envisaged that the rod holders can be an integral part of a shaker post fabrication.

As is shown the shaker rod assemblies 8, 9 are made of a particular shape and the preferred shape is that shown in FIG. 1 of the drawing. The first part 12 can be manufactured from a plastics material. The second part 13 can be manufactured from glass reinforced plastics material. Alternatively the first and second parts 12 and 13 can be manufactured from other materials, for example certain metal materials which give similar movement characteristics. The rigidity of the first part 12 is less than the rigidity of the second part 13. Alternatively the shaker rod assemblies can be manufactured from a combination of metal or plastics materials. The two parts of each assembly 8, 9 are linked by a sleeve 14. The parts 12, 13 when fitted in the sleeve 14 are crimped under pressure to engage them together. It is envisaged that the first and/or second parts 12, 13 may require resurfacing to ensure they are of an external shape complementary to the shape of the sleeve 14. The end of the part 13 where it is fitted in the rod holder 7 can have a rubber sleeve 21. The end of the other part 12 where it is engaged with its rod holder 6 can be locked in position by the locking pin 20.

The shaker rods 8, 9 generally move laterally (as arrowed) left 17 to right 18 in unison. The timing of the movement is maintained through an eccentric bearing system (not shown). Alternatively if required for certain fruits the shaker rods on one side can be designed to move in the opposite direction to the shakers on the other side.

In use a plurality of the shaker rods 8, 9 are mounted in a vertical orientation above each other within a harvester so that as the harvester moves in the direction of the arrow 15 the bush or vine passes between the two assemblies. To achieve the desired removal of fruit the shaker rods are designed to reciprocate at a frequency generally in the range of 200 rpm–300 rpm and up to 400 rpm if required.

The flex movement of each assembly is less than with existing fully plastic shaker rods because a degree of rigidity is imparted to each rod assembly by the second part 13 which reduces the fluctuations at the ends 16 of the rods. It has been this wild fluctuation of the ends of the rods which have caused problems with excessive damage with existing machines.

Thus by this invention there is provided an alternative construction of shaker rods for a grape or fruit harvester.

Particular examples of the invention have been described and it is envisaged that improvements and modifications can take place without departing from the scope of the appended claims.

What I do claim and desire to obtain by Letters Patent of the United States is:

1. A shaker rod for a harvester, the shaker rod being constructed in two parts of different rigidities, the first part of the shaker rod is constructed from a length of rod formed from a plastics material which is bent to include, in plan, a hook shaped region so that it is generally the shape of a head of a shepherd's crook with a handle which is curved, the second part and more rigid part is constructed from a generally straight length of fiberglass reinforced plastics rod which is joined to the hook shaped end of the first to thereby form a generally continuous U-shaped shaker rod the ends of which are mountable to shaker posts or shaker frames of a harvester which creates movement in the shaker rod when the harvester is used.

2. A shaker rod as claimed in claim 1 wherein the first and second parts of the shaker rod are joined by a sleeve constructed from any suitable material.

3. A shaker rod as claimed in claim 2 wherein the shaker rod is constructed of plastics materials of different rigidities.

4. A shaker rod as claimed in claim 3 wherein the sleeve is constructed from a metal material.

5. A shaker rod as claimed in claim 4 wherein the sleeve is crimped to the first and second parts.

6. A shaker rod for a harvester, the shaker rod being constructed in two parts of different rigidities, the first part of the shaker rod is constructed from a length of metal rod bent to include, in plan, a hook shaped region so that it is generally the shape of a head of a shepherd's crook with a handle which is curved, the second part and more rigid part being constructed from a generally straight length of metal rod which is joined to the hook shaped end of the first part, the first and second parts of the shaker rod are manufactured from metal materials of different rigidities selected to give in the first part a required degree of flexure the movement of which is stiffened by the counteracting movement of the second and more rigid part of to thereby form a generally continuous U-shaped shaker rod the ends of which are mountable to shaker posts or shaker frames of a harvester which creates movement in the shaker rod when the harvester is used.

7. A shaker rod as claimed in claim 6 wherein the shaker rod is round, square or rectangular in section so as to give a variety of different movements and a choice of surface contacts with the vine and/or fruit as required.

8. A harvester incorporating at least one shaker rod constructed in two parts of different rigidities, the first part of the shaker rod is constructed from a length of rod formed from a plastics material which is bent into the required shape and to include, in plan, a hook shaped region so that it is generally the shape of a head of a shepherd's crook with a handle which is curved, the second part and more rigid part is constructed from a generally straight length of fiberglass reinforced plastics rod which is joined to the hook shaped end of the first to thereby form a generally continuous U-shaped shaker rod the ends of which are mountable to shaker posts or shaker frames of a harvester which creates movement in the shaker rod when the harvester is used.

9. A shaker rod for a harvester, the shaker rod being constructed in two parts of different rigidities, the first part of the shaker rod is constructed from a length of rod formed from a plastics material and bent to include, in plan, a hook shaped region so that it is generally the shape of a head of a shepherd's crook with a handle which is curved, the second part more rigid part being constructed from a generally straight length of metal rod which is joined to the hook shaped end of the first part to thereby form a generally continuous U-shaped shaker rod the ends of which are mountable to shaker posts or shaker frames of a harvester which creates movement in the shaker rod when the harvester is used.

* * * * *